(12) United States Patent
Thangavelu

(10) Patent No.: US 8,191,134 B1
(45) Date of Patent: May 29, 2012

(54) LOCKLESS DISTRIBUTED IPSEC PROCESSING

(75) Inventor: Aravind Thangavelu, Dublin, CA (US)

(73) Assignee: SonicWALL, Inc., San Jose, CA (US)

( * ) Notice: Subject to any disclaimer, the term of this patent is extended or adjusted under 35 U.S.C. 154(b) by 856 days.

(21) Appl. No.: 12/240,784

(22) Filed: Sep. 29, 2008

(51) Int. Cl.
*G06F 7/04* (2006.01)
*G06F 9/00* (2006.01)
*G06F 11/00* (2006.01)

(52) U.S. Cl. .................. 726/14; 726/8; 726/11; 726/15; 726/22; 726/23

(58) Field of Classification Search .................... 726/14, 726/8, 11, 15, 22, 23
See application file for complete search history.

(56) References Cited

U.S. PATENT DOCUMENTS

| | | | |
|---|---|---|---|
| 7,600,131 B1 * | 10/2009 | Krishna et al. | 713/192 |
| 7,613,699 B2 * | 11/2009 | Noehring et al. | 1/1 |
| 2004/0039936 A1 * | 2/2004 | Lai | 713/201 |
| 2004/0205332 A1 * | 10/2004 | Bouchard et al. | 713/153 |
| 2006/0056406 A1 | 3/2006 | Bouchard et al. | |

\* cited by examiner

*Primary Examiner* — Mohammad Reza
(74) *Attorney, Agent, or Firm* — Blakely, Sokoloff, Taylor & Zafman LLP

(57) ABSTRACT

According to one embodiment of the invention, a plurality of IPsec packets belonging to a single IPsec tunnel are received. Different ones of the plurality of IPseck packets are distributed to different ones of a plurality of processing cores of a network element. At least some of those IPsec packets are processed in parallel and without taking a lock on a Security Association (SA) data structure storing a SA associated with the plurality of IPsec packets. The SA is atomically accessed and atomically updated.

18 Claims, 4 Drawing Sheets

LOCKLESS DISTRIBUTED IPSEC PROCESSING

BACKGROUND

1. Field

Embodiments of the invention relate to the field of network processing; and more specifically, to lockless IPsec processing in a distributed processing environment.

2. Background

A multi-core network processor is a network processor with two or more processing cores. Multi-core network processors may increase processing performance. Certain packets from the same stream or flow (e.g., having the same source and destination) may be processed concurrently by the multi-core network processor. However, certain packets belonging to the same stream have traditionally required serialized processing.

In a typical distributed processing environment, processing IPsec packets (IPSec is described in Request For Comments (RFC) 4301, "System Architecture for the Internet Protocol", December 2005) from the same stream (e.g., the same IPsec tunnel) requires serialized processing for at least a portion of the IPsec processing. To enforce serialization, a lock is typically used (e.g., a semaphore, tag, etc.) which prevents other processing cores from processing different packets of that IPsec stream while the lock is in place.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
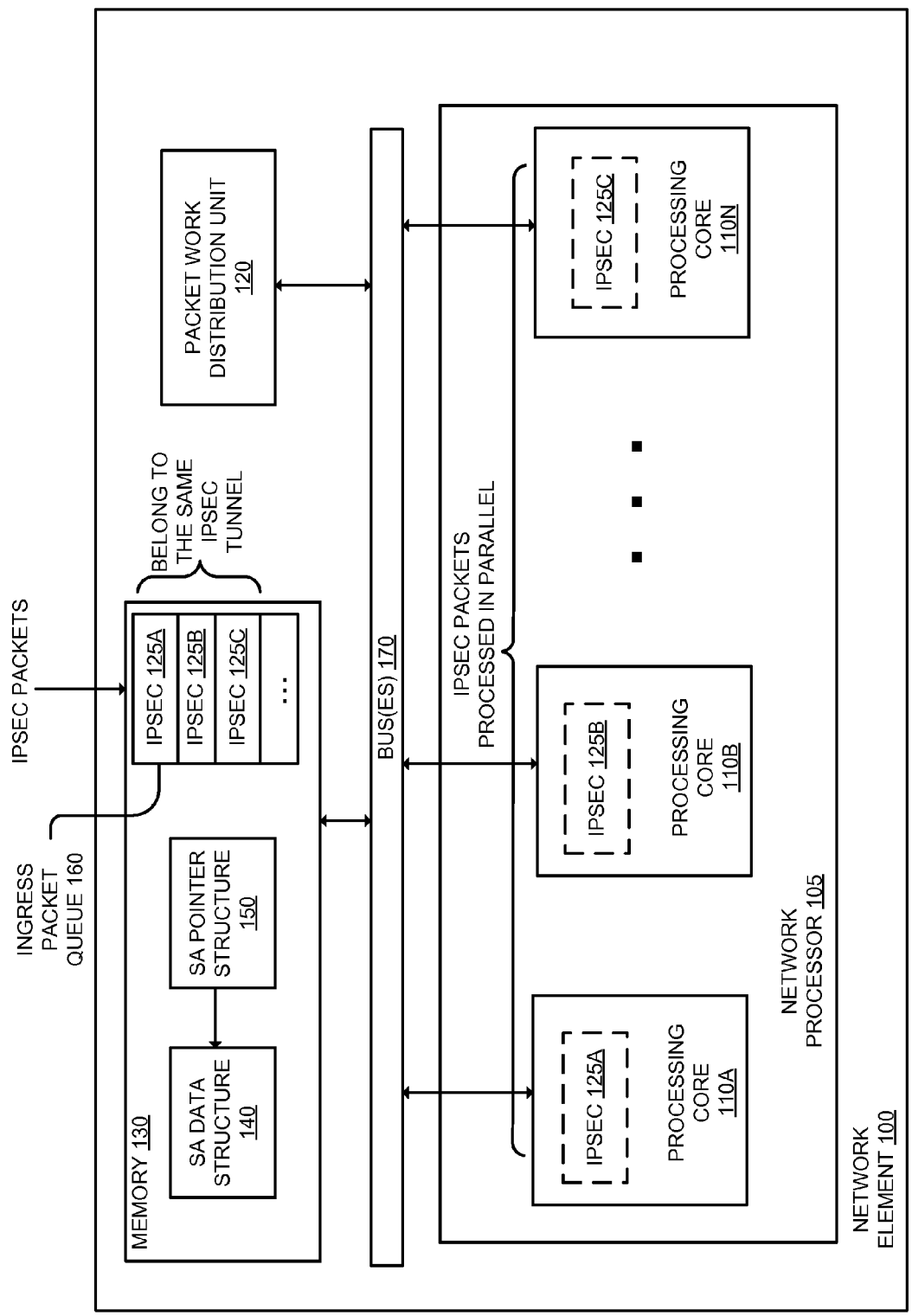
FIG. 1 is a block diagram illustrating an exemplary distributed packet processing architecture according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., a computer end station, a network element (e.g., a switch, bridge, router, secure router, unified threat management (UTM) appliance, etc.), etc.). Such electronic devices store and communicate (internally and with other electronic devices over a network) code and data using machine-readable media, such as machine storage media (e.g., magnetic disks; optical disks; random access memory; read only memory; flash memory devices; phase-change memory) and machine communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard, a touchscreen, and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element is a piece of networking equipment including hardware and software that performs operations including communicatively interconnection other equipment on the network (e.g., router, switch, bridge, UTM, computer end stations, etc.) and security operations (e.g., firewall, gateway anti-virus, anti-spyware, intrusion detection system, intrusion prevention system, web content filtering, and/or IPSec VPN, etc.).

A method and apparatus for lockless IPsec processing in a distributed processing environment is described. In one embodiment of the invention, a network element receives a plurality of IPsec packets from the same IPsec tunnel. Different ones of the packets are distributed to different ones of a plurality of processing cores of the network element. Atomic operations (e.g., atomic write, atomic read) are used to allow the processing cores to process the IPsec packets in parallel and without taking a lock on one or more data structures related to a Security Association (SA) associated with those IPsec packets.

FIG. 1 is a block diagram illustrating an exemplary distributed packet processing architecture according to one embodiment of the invention. It should be understood that the architecture illustrated in FIG. 1 is exemplary, and other alternative architectures may be used in embodiments of the invention described herein. It should also be understood that well known features of a network element (e.g., specific busses, circuits, memory(ies), network intefaces, etc.) have not been illustrated in FIG. 1 in order not to obscure the understanding of the invention.

The network element 100 includes the network processor 105, the packet work distribution unit 120, the memory 130, and one or more busses 170. The network processor 105 is a multi-core processor that includes the processing cores 110A-110N. The memory 130 includes the SA data structure 140, the SA pointer data structure 150, and the ingress packet queue 160. The SA data structure 140 stores SAs. Each SA includes a set of one or more values. For example, typically a security association includes a destination address, a security parameter index (SPI), a lifetime value (a SA is typically valid for a limited amount of time), and one or more keys. According to one embodiment of the invention the SA data structure 140 is a Security Association Database (SADB) as is known in the art. It should be understood that although the SA data structure 140 is illustrated as being local to the network element 100, the SA data structure 140 may be stored remotely (e.g., in a AAA server) and accessible over a network link.

The SA pointer structure 150 stores pointers to the security association. The SA pointer structure 150 will be described in greater detail with reference to FIG. 2. The ingress packet queue 160 stores incoming packets (or at least references to incoming packets) that are to be processed by one of the processing cores 110A-110N. According to one embodiment of the invention, the ingress packet queue 160 stores packets according to packet arrival order.

The packet work distribution unit 120 is coupled with the memory 130, and coupled with the network processor 105 (e.g., through the one or more busses 170). The packet work distribution unit 120 distributes work (e.g., a packet) to different ones of the processing cores 110A-110N. The packet work distribution unit 120 may distribute work in any number of known means (e.g., based on availability of the processing cores, etc.). According to one embodiment of the invention, the packet work distribution unit 120 distributes packets in the order the packets are stored in the ingress packet queue 160 (e.g., a first-in-first out order). For example, the first packet stored in the ingress packet queue 160 is the first packet the packet work distribution unit 120 distributes to the processing cores 110A-110N.

The network element 100 processes network packets including IPsec packets. The IPsec packets 125A-125C are received by the network element 100 and are stored in the ingress queue 160. The IPsec packet 125A was received first in time and the IPsec packet 125C was received last in time. According to one embodiment of the invention, the IPsec packets 125A-125C each belong to the same IPsec stream (e.g., the same IPsec tunnel). By way of example, the IPsec packets 125A-125C have the same source IP address and the same destination IP address. According to one embodiment of the invention, since the IPsec packets 125A-125C belong to the same IPsec steam, they are each associated with the same SA. Thus, each of the IPsec packets 125A-125C are processed using the same SA (e.g., the same keys). However, it should be understood that certain values of the SA may change throughout the processing of the IPsec packets.

It should be understood that packet processing efficiency will be increased if the IPsec packets 125A-125C can be processed concurrently. That is, processing efficiency improves when the IPsec packets 125A-125C are processed in parallel by multiple processing cores. Therefore, the packet work distribution unit 120 distributes the IPsec packets 125A-125C to different ones of the processing cores 110A-110N. For purposes of the following description, the packet work distribution unit 120 distributes the IPsec packet 125A to the processing core 110A, the IPsec packet 125B to the processing core 110B, and the packet 125C to the processing core 110N.

Figure 2:
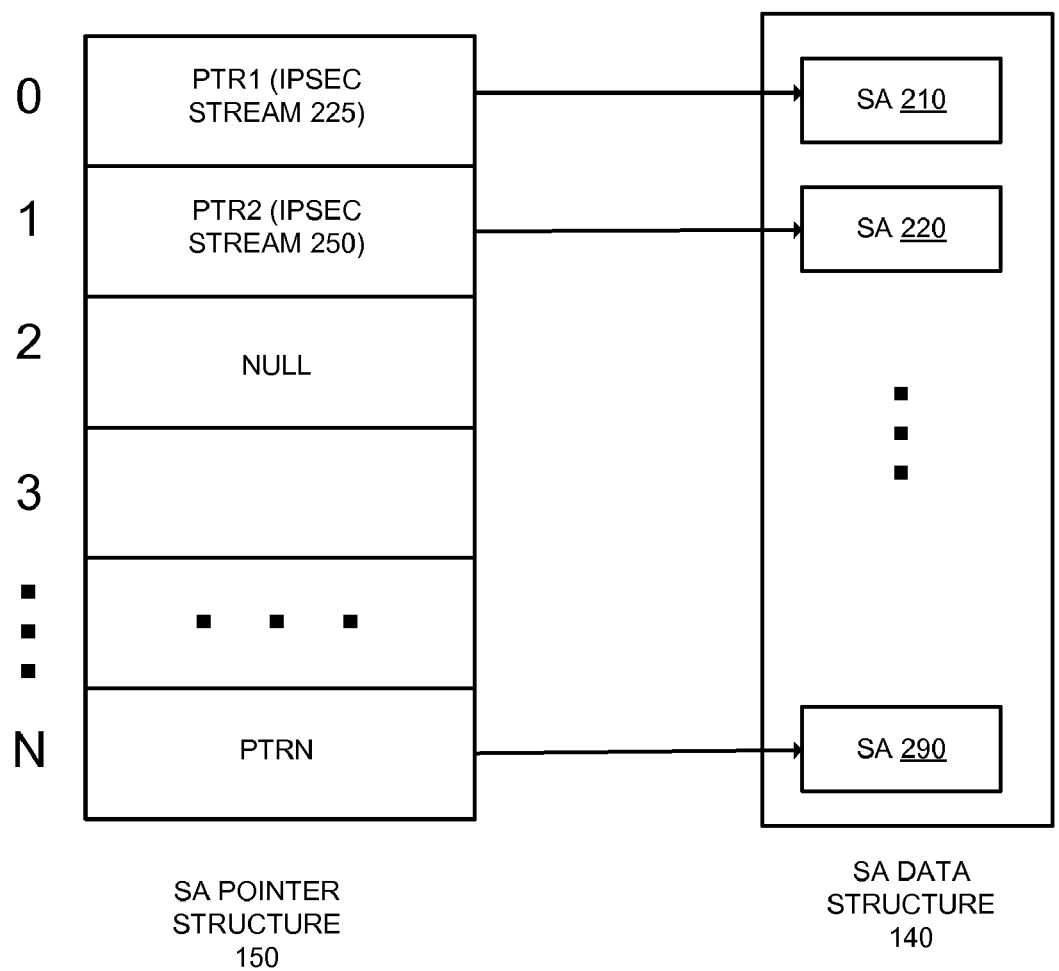
FIG. 2 is a block diagram illustrating an exemplary Security Association pointer structure according to one embodiment of the invention.

FIG. 2 is a conceptual block diagram illustrating the relationship between the SA pointer structure 150 and the SA data structure 140 according to one embodiment of the invention. In FIG. 2, the SA pointer structure 150 is illustrated as an array. However, embodiments of the invention are not so limited as the SA pointer structure 150 may be implemented as a different data structure. The SA pointer structure 150 stores pointers to SAs stored in the SA data structure 140. The SAs 210, 220, and 290 are each stored in the SA data structure 140.

The SA pointer structure 150 illustrated in FIG. 2 includes N+1 elements. The first entry of the SA pointer structure 150 (illustrated at element 0) stores the ptr1 (which corresponds to the IPsec stream 225) which points to the SA 210. The second entry of the SA pointer structure 150 (illustrated at element 1) stores the ptr2 (which corresponds to the IPsec stream 250) which points to the SA 220. The third entry of the SA pointer structure 150 (illustrated at element 2) stores a NULL pointer which does not point to a SA. The N+1 entry of the SA pointer structure 150 (illustrated at element N) stores the ptrN which points to the SA 290. According to one embodiment of the invention, the IPsec packets 125A-125C are each associated with the SA 210.

Typical distributed processing architectures require a locking mechanism to be used while processing multiple IPsec packets from the same IPsec tunnel at different processing cores. For example, typically a processing core places a lock (e.g., a semaphore, tag, etc.) on one or more of the data structures related to IPsec processing (e.g., the SA data structure 140 and/or the SA pointer structure 150) to prevent other processing cores from accessing those structures. This leads to serialized processing of at least a portion of the IPsec packets. It should be understood that serialized processing is less efficient than parallel processing (e.g., IPsec packets belonging to the same IPsec stream are processed faster when processed in parallel as compared with processing those packets serially). In contrast, embodiments of the invention allow for parallel processing of IPsec packets from the same IPsec tunnel without taking a lock.

Figure 3:
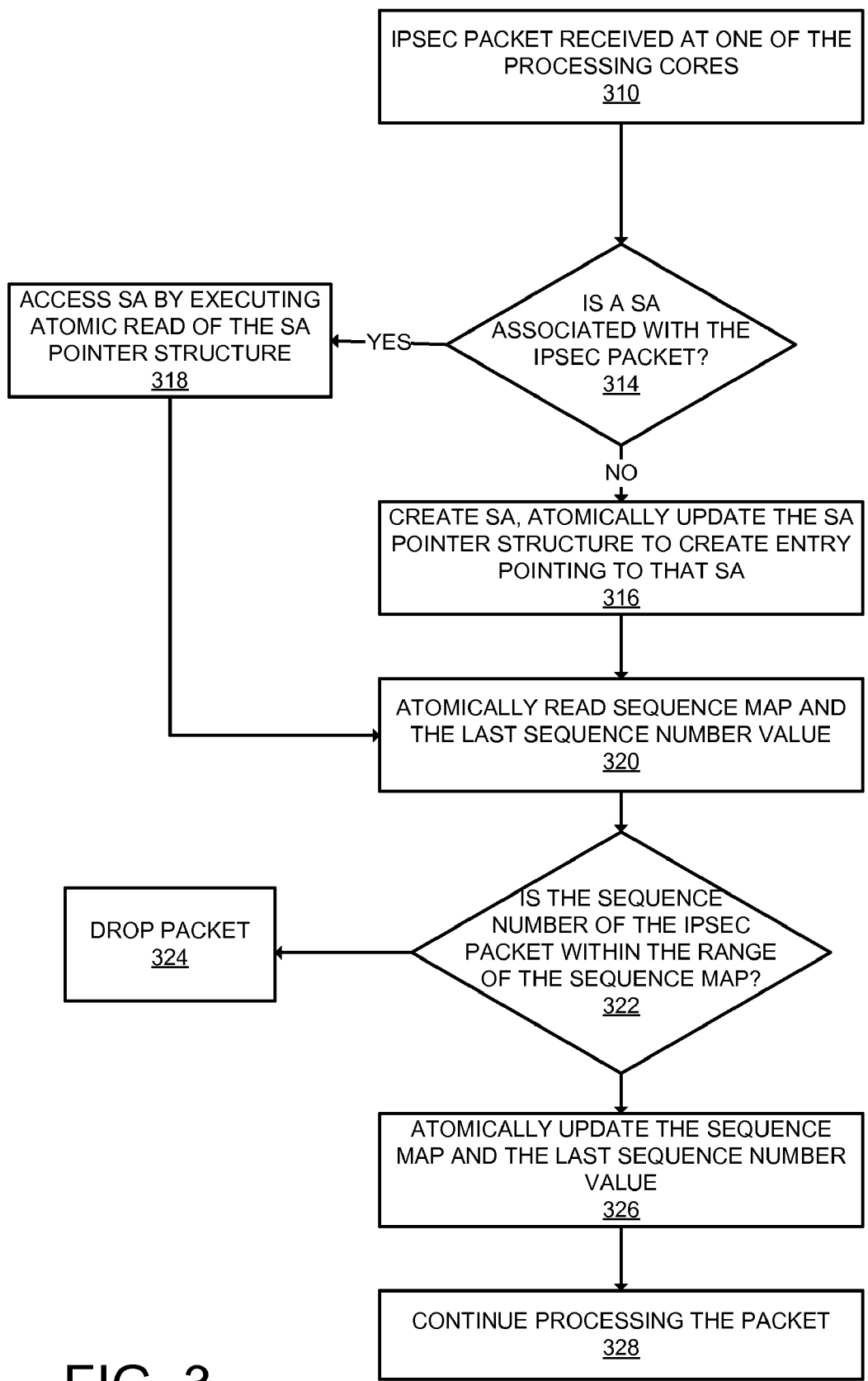
FIG. 3 is a flow diagram illustrating exemplary operations for lockless IPsec processing in a distributed processing environment according to one embodiment of the invention.

FIG. 3 is a flow diagram illustrating exemplary operations for lockless IPsec processing in a distributed processing environment according to one embodiment of the invention. The operations of FIG. 3 may be performed by embodiments of the invention described with reference to FIGS. 1 and 2. However, it should be understood that the operations of FIG. 3 can be performed by embodiments of the invention other than those discussed with reference to FIGS. 1 and 2, and the embodiments discussed with reference to FIGS. 1 and 2 can perform operations different than those discussed with reference to FIG. 3.

At block 310, an IPsec packet is received at one of a plurality of processing cores. For example, with reference to FIG. 1, the packet work distribution unit 120 distributes the IPsec packet 125B to the processing core 110B. Flow moves from block 310 to block 314. According to one embodiment of the invention, processing an IPsec packet involves a number of processing stages (e.g., decryption, verification, sequence number handling, encryption, etc.). These processing stages are not specifically illustrated in FIG. 3 in order not to confuse understanding of the invention. However, it should be understood that the network element performs these processing stages in embodiments of the invention. It should be understood that in previous distributed IPsec packet processing schemes, locks (e.g., semaphore, tags, etc.) are used to serialize certain of the IPsec processing phases. For example, in previous schemes, typically the sequence number handling phase is serialized.

At block 314, a determination is made whether a SA is associated with the IPsec packet. If a SA is not associated with the IPsec packet, then flow moves to block 316. However, if a SA is associated with the IPsec packet, then flow moves to block 318. At block 316, a SA is created and stored, and also associated with the IPsec packet. For example, an entry is atomically added to the SA pointer structure (e.g., the SA pointer structure 150) which points to the newly created SA. According to one embodiment of the invention, an atomic write operation is used to add the entry into the SA pointer structure. As is known in the art, an atomic operation (e.g., an atomic write or atomic read) does not take effect until and unless the set of operations of that atomic operation are complete, and other processes (e.g., executing on the other processing cores) are not aware of the changes until the atomic operation is complete. Atomic operations thus ensure that data coherency is maintained. Thus, at any given time, atomic operations ensure that a processing core has the correct version of the data. Flow moves from block 316 to block 320.

At block 318, the SA is accessed. For example, the processing core executes an atomic read instruction on the SA pointer structure (e.g., the processing core 110B executes an atomic read instruction on the SA pointer structure 150) to access the SA. Flow moves from block 318 to block 320 where an anti-replay check (e.g., verification) begins processing. Each IPsec packet received includes a sequence number. The network element may store a sequence map (e.g., a window) and the last sequence number processed for a particular IPsec tunnel (these values may be stored in one location in memory). According to one embodiment of the invention, the sequence map and the last sequence number processed are stored with the SA. The sequence map is a range of values of sequence numbers that have been recently processed (the sequence map may include a number of values (e.g., 32)). If the sequence number of the packet is not within the window, an exception may be taken (e.g., the packet is dropped). According to one embodiment of the invention, the processing core executes an atomic read operation to read the sequence map and the last sequence number. Thus, at block 320, the processing core atomically reads the sequence map and the last sequence value. Flow moves from block 320 to block 322.

At block 322, the values read from the operation of block 320 are compared with the sequence number included in the IPsec packet, and a determination is made whether that sequence number is within the range of the sequence map. If the sequence number of the IPsec packet is not within the range of the window, then flow moves to block 324 where the packet is dropped. If the sequence number of the IPsec packet is within the range of the window, then flow moves to block 326.

At block 326, the processing core executes an atomic write operation to update the sequence map and the last sequence number processed if necessary. For example, if the value of the last sequence number is less then the value of the sequence number of the IPsec packet being processed, the last sequence number is updated to correspond with the value of the sequence number of the IPsec packet being processed. Flow moves from block 326 to block 328, where the processing of the IPsec packet continues (e.g., other processing phases are entered). For example, if the IPsec packet is destined to exit the network element, the packet will enter an encryption phase, where the IPsec packet will be encrypted. According to one embodiment of the invention, a new sequence number will be added to the outgoing IPsec packet. According to one embodiment of the invention, the processing core executes an atomic write operation to increment the sequence number of that IPsec packet by one in the outgoing IPsec packet.

Figure 4:
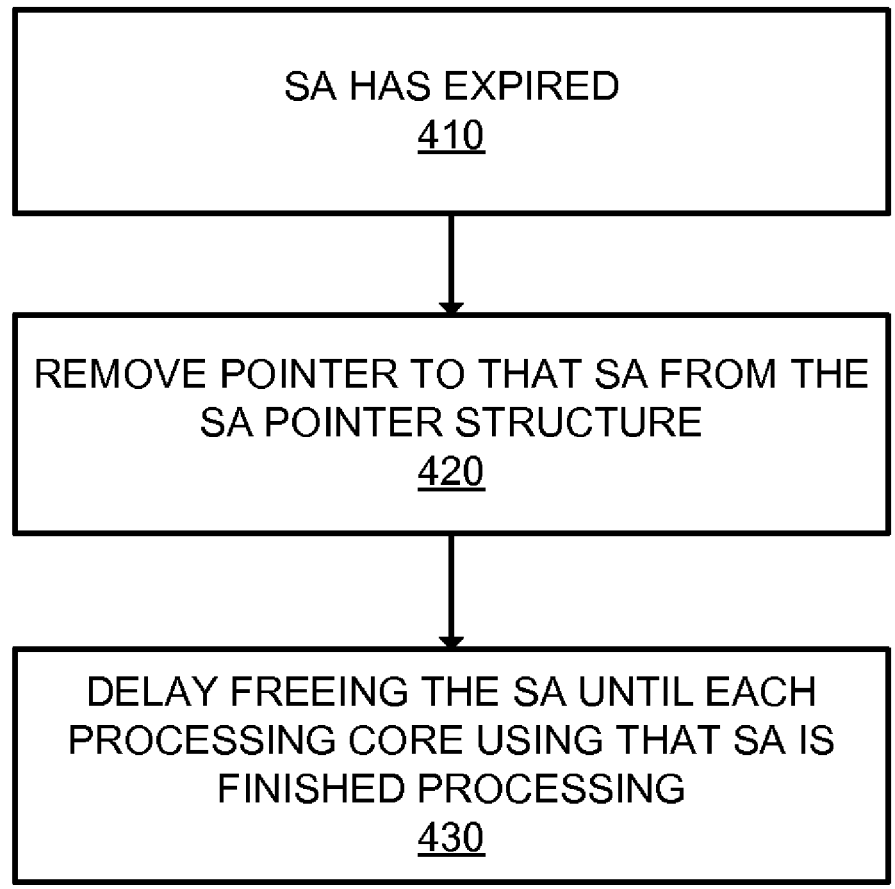
FIG. 4 is a flow diagram illustrating exemplary operations for removing a Security Association according to one embodiment of the invention.

SAs are typically valid for a limited time before they need to be re-created and/or refreshed (e.g., an SA typically includes a lifetime value). In addition, since the network element has only a limited memory, SAs are often removed once they have expired. FIG. 4 is a flow diagram illustrating exemplary operations for removing a SA according to one embodiment of the invention.

At block 410, an SA has expired (e.g., the lifetime value has been exceeded). Flow moves from block 410 to block 420. At block 420, the pointer to that SA is removed from the SA pointer structure (e.g., the SA pointer structure 150). According to one embodiment of the invention, a null pointer is atomically written at the appropriate index. For example, with reference to FIG. 2, a null pointer has been written to the third entry of the SA pointer structure 150. Flow moves from block 420 to block 430.

Since it is possible that other processing cores may be using the SA, according to one embodiment of the invention the SA is not removed from the SA data structure 140 until each processing core is finished using that SA. Thus, at block 430, the SA is delayed from being removed from the SA data structure (e.g., the SA data structure 140) until each packet holding the SA is finished processing. According to one embodiment of the invention, the SA is delayed for an amount of time that it would be expected that all processing cores currently processing IPsec packets associated with that expired SA finish processing. In an alternative embodiment of the invention, the processing cores are polled to determine when they are completed using that expired SA and the SA will be removed after each of the processing cores are finished using that SA.

It should be understood that as long as IPsec packets belonging to the same IPsec stream are distributed to the processing cores in the order the IPsec packets are received, the IPsec packets should not get out of order. However, in some embodiments of the invention an out-of-order detection and correction mechanism is used to detect and correct out-of-order IPsec packets.

Thus, lockless IPsec processing in a distributed processing environment is described. Embodiments of the invention described herein allow for IPsec packets belonging to the same IPsec tunnel to be processed in parallel and without taking a lock on one or more data structures relating to the SA associated with that IPsec tunnel. According to one embodiment of the invention, atomic operations (e.g., atomic write and atomic read) are used to maintain data coherency when accessing and/or modifying the SA associated with that IPsec tunnel, and an expired SA is not removed until each processing core using that SA has completed processing.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for lockless Internet Protocol Security (IPsec) processing performed on a network element, comprising:
receiving a plurality of IPsec packets each belonging to a single IPsec tunnel;
distributing different ones of the plurality of IPsec packets to different ones of a plurality of processing cores of the network element for processing; and
processing at least some of those IPsec packets in parallel and without taking a lock on a Security Association (SA) data structure storing a SA associated with each of the plurality of IPsec packets, wherein the processing includes:
for each processing core that is processing one of the plurality of IPsec packets,
atomically accessing the SA associated with that IPsec packet, wherein the atomically accessing the SA includes accessing a SA pointer structure, which stores a pointer to the SA, with an atomic read operation,
atomically read a sequence map and a last sequence number for that IPsec packet, wherein if the sequence number of that IPSec packet is not within the range of the sequence map, the processing core to drop that IPSec packet,
using values of the SA during processing of that IPsec packet, and
atomically updating at least certain values of that SA.

2. The method of claim 1, further comprising for each of the plurality of IPsec packets received, if the sequence number of the packet is not within the range of the sequence map, issuing an exception.

3. The method of claim 2, further comprising updating the sequence map and the last sequence number based on values derived from processing that IPsec packet.

4. The method of claim 1, further comprising upon the SA expiring, nullifying the pointer to the SA and delaying removal of the SA until each processing core has finished accessing the SA.

5. The method of claim 1, further comprising creating a SA for the plurality of IPsec packets upon determining that a SA is not associated with those IPsec packets.

6. The method of claim 5, wherein the creating the SA further includes atomically adding a pointer to the created SA in the SA pointer structure with an atomic write operation.

7. A network element to process Internet Protocol Security (IPsec) packets in a distributed processing environment, comprising:
one or more interfaces to receive a plurality of IPsec packets belonging to a single IPsec tunnel;
a packet work distribution unit to distribute the plurality of IPsec packets to different ones of a plurality of processing cores;
a Security Association (SA) data structure to store one or more SAs, wherein each of the plurality of IPsec packets is associated with the same SA;
a SA pointer structure which includes one or more pointers referencing the SA data structure, wherein each of the processing core is to access the SA pointer structure with an atomic read operation to determine the location of the SA associated with the IPSec tunnel;
the plurality of processing cores to process the IPsec packets in parallel and without taking a lock on the SA data structure, wherein each processing core that receives one of the IPsec packets to process is to:
atomically access a SA associated with that IPsec packet, wherein each of the processing core is to access the SA pointer structure with an atomic read operation to determine the location of the SA associated with the IPSec tunnel,
atomically read a sequence map and a last sequence number for that IPsec packet, wherein if the sequence number of that IPSec packet is not within the range of the sequence map, the processing core to drop that IPSec packet,
use values of that SA during the processing, and
atomically update a sequence number of that SA.

8. The network element of claim 7, further comprising an ingress queue to store the plurality of IPsec packets according to arrival order, wherein the packet work distribution unit is to distribute the IPsec packets based on the arrival order of those IPsec packets.

9. The network element of claim 7, further comprising each of the processing cores to update the sequence map and the last sequence number based on values derived from processing an IPsec packet.

10. The network element of claim 7, further comprising the processing cores to nullify the pointer to the SA associated with the IPsec tunnel upon the SA expiring and to delay removal of the SA until each processing core has finished using that SA.

11. The network element of claim 10, wherein each of the processing cores is further to create a SA for the plurality of IPsec packets upon determining that a SA is not associated with the plurality of IPsec packets.

12. The network element of claim 11, wherein the create the SA includes the processing core to atomically add a pointer to the created SA in the SA pointer structure with an atomic write operation.

13. A non-transitory machine-readable storage medium that provides instructions that, if executed by a processor, will cause said processor to perform operations for lockless Internet Protocol Security (IPsec) processing, the operations comprising:
receiving a plurality of IPsec packets each belonging to a single IPsec tunnel;
distributing different ones of the plurality of IPsec packets to different ones of a plurality of processing cores of the network element for processing; and
processing at least some of those IPsec packets in parallel and without taking a lock on a Security Association (SA) data structure storing a SA associated with each of the plurality of IPsec packets, wherein the processing includes:
for each processing core that is processing one of the plurality of IPsec packets,
atomically accessing the SA associated with that IPsec packet, wherein atomically accessing the SA includes accessing a SA pointer structure, which stores a pointer to the SA, with an atomic read operation,
atomically read a sequence map and a last sequence number for that IPsec packet, wherein if the sequence number of that IPSec packet is not within the range of the sequence map, the processing core to drop that IPSec packet,
using values of the SA during processing of that IPsec packet, and
atomically updating at least certain values of the SA.

14. The non-transitory machine-readable storage medium of claim 13, further comprising for each of the plurality of IPsec packets received, if the sequence number of the packet is not within the range of the sequence map, issuing an exception.

15. The non-transitory machine-readable storage medium of claim 14, further comprising updating the sequence map and the last sequence number based on values derived from processing that IPsec packet.

16. The non-transitory machine-readable storage medium of claim 13, further comprising upon the SA expiring, nullifying the pointer to the SA and delaying removal of the SA until each processing core has finished accessing the SA.

17. The non-transitory machine-readable storage medium of claim 13, further comprising creating a SA for the plurality of IPsec packets upon determining that a SA is not associated with those IPsec packets.

18. The non-transitory machine-readable storage medium of claim 17, wherein the creating the SA further includes atomically adding a pointer to the created SA in the SA pointer structure with an atomic write operation.

* * * * *